(12) United States Patent
Engebretsen et al.

(10) Patent No.: US 9,197,497 B2
(45) Date of Patent: Nov. 24, 2015

(54) CONFIGURATION OF NETWORK ENTITIES USING FIRMWARE

(71) Applicant: International Business Machines Corporation

(72) Inventors: David R. Engebretsen, Cannon Falls, MN (US); Henry J. May, Cedar Falls, IA (US); Paul E. Movall, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 313 days.

(21) Appl. No.: 13/743,110

(22) Filed: Jan. 16, 2013

(65) Prior Publication Data

US 2014/0201338 A1    Jul. 17, 2014

(51) Int. Cl.
*G06F 15/177*    (2006.01)
*H04L 12/24*    (2006.01)
*H04L 12/931*    (2013.01)

(52) U.S. Cl.
CPC .......... *H04L 41/0803* (2013.01); *H04L 49/357* (2013.01)

(58) Field of Classification Search
CPC .......................... H04L 49/357; H04L 61/6045
USPC .................................................. 709/220, 221
See application file for complete search history.

(56) References Cited

U.S. PATENT DOCUMENTS

| | | | |
|---|---|---|---|
| 2006/0098681 A1 | 5/2006 | Cafiero et al. | |
| 2009/0276526 A1* | 11/2009 | Carlson et al. | 709/225 |
| 2011/0064086 A1* | 3/2011 | Xiong et al. | 370/401 |
| 2011/0176412 A1 | 7/2011 | Stine et al. | |
| 2011/0196958 A1 | 8/2011 | Bharadwaj et al. | |
| 2011/0258641 A1* | 10/2011 | Armstrong et al. | 719/327 |

OTHER PUBLICATIONS

Desanti et al., "Distributed FCF," T11/11-026v3, Oct. 2011.

* cited by examiner

*Primary Examiner* — Joseph E Avellino
*Assistant Examiner* — Marshall McLeod
(74) *Attorney, Agent, or Firm* — Toler Law Group, P.C.

(57) ABSTRACT

A method includes receiving firmware at a network entity and determining whether the network entity is to operate as a controlling Fiber Channel forwarder based on the firmware.

19 Claims, 4 Drawing Sheets

FIG. 4

CONFIGURATION OF NETWORK ENTITIES USING FIRMWARE

I. FIELD OF THE DISCLOSURE

The present disclosure is generally related to configuration of network entities using firmware.

II. BACKGROUND

Fiber Channel is a high speed networking technology used to connect devices in storage area networks (SANs). Endpoint devices in a Fiber Channel network communicate with each other via fabrics. Fiber Channel fabrics are made up of one or more switches. Each fabric and each device in the Fiber Channel Network may be uniquely identified by a world wide name (WWN). Once an endpoint device logs in to a fabric, the WWN of the fabric remains the same for the connection between the endpoint device and the fabric to persist. The fabric does not change names (e.g., does not change from a first WWN to a second WWN) while providing services without interrupting the connection.

WWNs are typically associated with a physical resource, and a fabric may be made up of multiple physical resources. Typically, one of the physical resources provides the fabric WWNs for all components of the fabric. If the resource that provides the fabric WWNs is removed from a configuration, the WWNs may no longer be valid. Therefore, removing the resource that provides fabric WWNs may involve taking down all of the connections to the fabric and forcing each of the endpoint devices to discover and log in to the fabric with a new WWN.

III. SUMMARY OF THE DISCLOSURE

In a particular embodiment, a method includes receiving firmware at a network entity and determining whether the network entity is to operate as a controlling Fiber Channel forwarder (cFCF) based on the firmware. A Fiber Channel fabric administrator may send firmware to a network entity to enable the network entity to operate as a cFCF.

In another particular embodiment, a computer program product includes a computer readable storage medium and program instructions to determine whether a network entity is to operate as a controlling Fiber Channel forwarder. The program instructions are stored on the computer readable storage medium.

V. DETAILED DESCRIPTION

A system and method for configuring redundant controlling Fiber Channel (also known as Fibre Channel) forwarders (FCFs) in a distributed Fiber Channel forwarder is disclosed. The system and method provides consistency of fabric world wide names (WWNs) used by the distributed FCF throughout operation. Consistency is provided by using firmware to configure a primary controlling FCF (cFCF) and secondary cFCF. The secondary cFCF stores and uses the WWNs of the primary cFCF to advertise fabric services. In addition, the primary cFCF detects when it has been moved to another distributed FCF. When the primary cFCF has been moved to another distributed FCF, the primary cFCF does not use the WWNs of the primary cFCF, but rather requests user intervention of some kind. The described techniques may thus allow the fabric WWNs of a fabric to remain consistent even when the device providing the fabric WWNs of the fabric is removed from the fabric or ceases to function.

Figure 1:
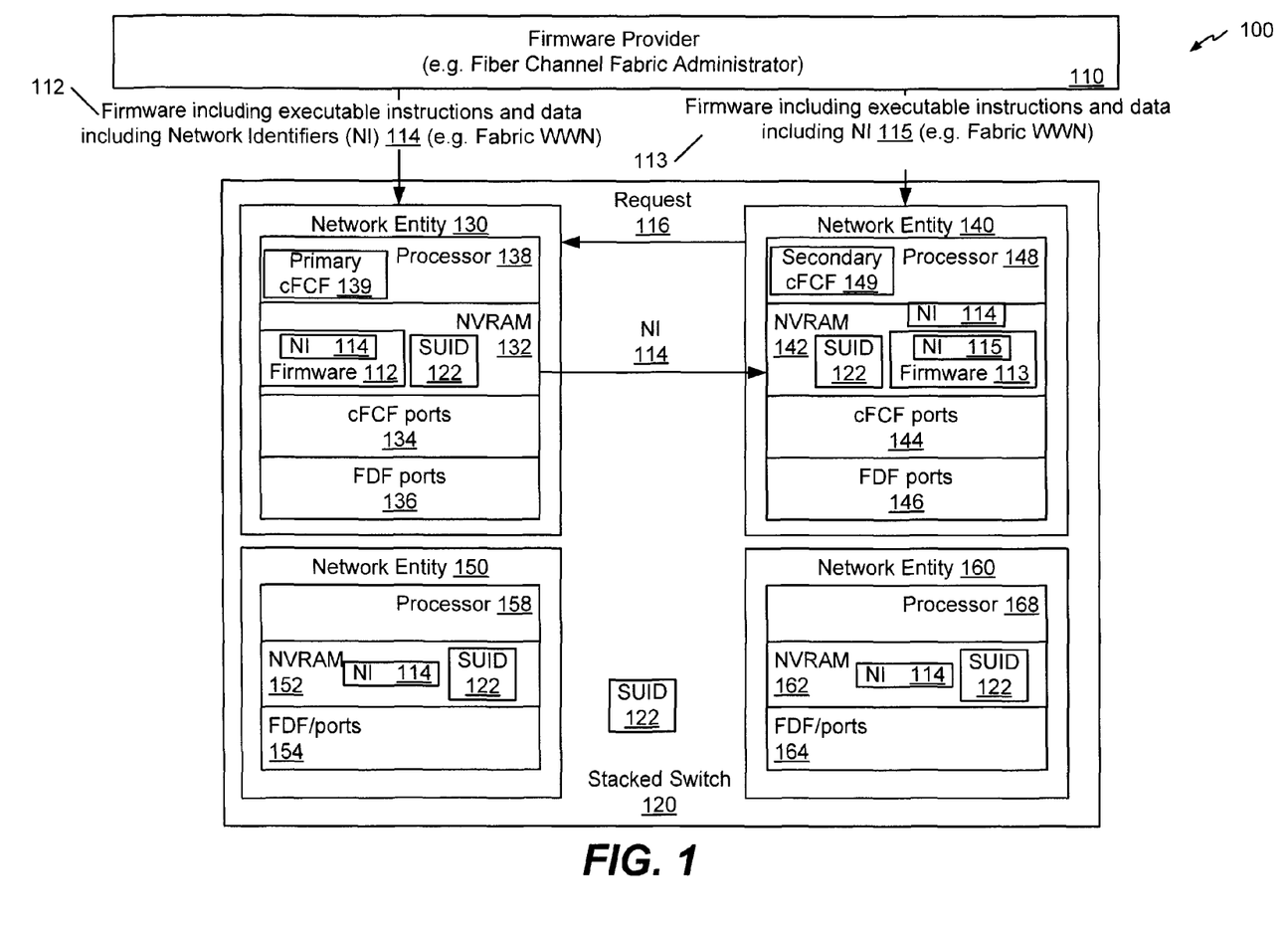
FIG. 1 is a diagram of a first embodiment of a system that is operable to distribute and maintain network identifiers using firmware.

Referring to FIG. 1, a particular illustrated embodiment of a system 100 is shown. The system 100 includes a stacked switch 120. The stacked switch 120 is responsive to a firmware provider 110. The stacked switch 120 may include a plurality of network entities. For example, the stacked switch 120 includes a first network entity 150 and a second network entity 160. The stacked switch 120 may further include additional network entities, such as a network entity 130 functioning as a primary cFCF and a network entity 140 functioning as a secondary cFCF.

The network entity 130 may include a processor 138. The network entity 130 also includes a non-volatile memory. In a particular embodiment the non-volatile memory is a non-volatile random access memory (NVRAM) 132, as illustrated. The network entity 130 further includes a plurality of cFCF ports 134 and a plurality of Fiber Channel over Ethernet data forwarder (FDF) ports 136.

The network entity 140 may include a processor 148. The network entity 140 also includes a non-volatile memory. In a particular embodiment, the non-volatile memory is a NVRAM 142. The network entity 140 also includes a plurality of cFCF ports 144 and a plurality of FDF ports 146.

Each of the network entities 150 and 160 may include a processor, non-volatile memory and FDF ports. For example, the first network entity 150 may include a processor 158, a NVRAM 152 and a plurality of FDF ports 154. The second network entity 160 may include a processor 168, a NVRAM 162 and a plurality of FDF ports 164.

The stacked switch 120 has a stacked switch system unique identifier (SUID) 122. The SUID 122 uniquely identifies, within a network, a particular stacked switch and may be negotiated when the stacked switch 120 is formed. For example, the SUID 122 may be a unique number that has a one-to-one mapping to identify the stacked switch 120. Other stacked switches (not shown) would have different SUIDs. In a particular embodiment, each network entity 130, 140, 150, 160 may store the SUID 122 within the NVRAM 132, 140, 150, 160 of the network entity 130, 140, 150, 160. The network entity 130, 140, 150, 160 may store the SUID 122 after negotiation of the SUID 122 or after being powered up. The SUID 122 may be an alpha numeric string unique to the particular stacked switch 120.

During operation, the firmware provider 110 (e.g., a computer acting as a Fibre Channel fabric administrator) may provide firmware 112 to the network entity 130 based on a request (not shown) from a user or from the network entity 130 and may provide firmware 113 to the network entity 140 based on a request (not shown) from a user or from the network entity 140. In a particular embodiment, the firmware 112 includes executable instructions and data including network identifiers (NI) 114 (e.g. fabric world wide names (WWNs)). A WWN may be an 8 or 16 byte number that globally uniquely identifies a device or fabric. Similarly, the firmware 113 may include executable instructions and data including network identifiers, such as fabric WWNs.

After being powered up, the network entity 130 may begin to communicate with the firmware provider 110 in order to receive the firmware 112. In the example shown in FIG. 1, the network entity 130 receives the firmware 112 including data that may include an authorization key, the network identifiers 114 (e.g. fabric WWNs), or any combination thereof. The network entity 130 may store the firmware 112 including the network identifiers 114 at the NVRAM 132. The network entity 130 may determine based on the firmware 112, whether the network entity 130 is to operate as a cFCF. For example, the processor 138 at the network entity 130 may execute the firmware 112 and may access the network identifiers 114 and the authorization key in order to determine whether the network entity 130 is to be operated as a cFCF. To illustrate, after receiving the firmware 112, the processor 138 within the network entity 130 may execute firmware code. Executing the firmware code at the processor 138 may instantiate certain data and identify certain rules or logic that correspond with functionality of a cFCF 139. After the firmware code has been executed, corresponding data is instantiated, and associated configuration rules are established to enable the network entity 130 to begin to function as a cFCF 139. The firmware 112 may further include an indication that the network entity 130 is to operate in a first mode (e.g. as a primary cFCF) as described below.

A primary cFCF may use its network identifiers to advertise fabric services. Advertising fabric services may include announcing the presence of the fabric to a network and announcing address modes that the fabric supports. In addition, at startup, the primary cFCF may detect when the primary cFCF has been moved to another stacked switch. When the primary cFCF detects that the primary cFCF has been moved, the primary cFCF may request input regarding fabric services instead of advertising fabric services with the network identifiers of the primary cFCF.

The network entity 140 may also receive firmware from the firmware provider 110. In the example shown in FIG. 1, the network entity 140 receives the firmware 113 including data that may include an authorization key, network identifiers 115 (e.g. fabric WWNs), or any combination thereof. The network entity 140 may store the firmware 113 including the network identifiers 115 at the NVRAM 142. The network entity 140 may determine, based on the firmware 113, whether the network entity 140 is to operate as a cFCF. For example, the processor 148 at the network entity 140 may execute the firmware 113 and may access the network identifiers 115 and the authorization key in order to determine whether the network entity 140 is to be operated as a cFCF. To illustrate, after receiving the firmware 113, the processor 148 within the network entity 140 may execute firmware code. Executing the firmware code at the processor 148 may instantiate certain data and identify certain rules or logic that correspond to functionality of a cFCF 149. After the firmware code is executed, corresponding data is instantiated and associated configuration rules are established to enable the network entity 140 to begin to function as the cFCF 149 as illustrated. The firmware 113 may further include an indication that the network entity 140 is to operate in a second mode (e.g. as a secondary cFCF) as described below.

A secondary cFCF is different from a primary cFCF in that the secondary cFCF uses a set of network identifiers received from a primary cFCF to advertise fabric services. Advertising fabric services may include announcing the presence of the fabric to a network and announcing address modes that the fabric supports. In a particular embodiment, a secondary cFCF may initially be in a standby mode and may not advertise fabric services until a triggering event, such as the removal of or damage to the primary cFCF, prompts the secondary cFCF to being advertising fabric services. Alternatively, the secondary cFCF may advertise fabric services as soon as network identifiers are received from the primary cFCF.

The firmware 112 and/or the firmware 113 may be configured to program a network entity (e.g., the network entity 130 and/or the network entity 140) to operate as a cFCF in connection with a distributed Fiber Channel forwarding system. Thus, Fiber Channel forwarding functionality may be distributed among various network entities within the stacked switch 120. For example, all of the network entities 130, 140, 150, 160 of the stacked switch 120 may use the network identifiers 114 of the network entity 130 operating as a primary cFCF 139 for the FDF ports 136, 146, 154, 164 of the network entities 130, 140, 150, 160. The network entities 140, 150, 160 may acquire the network identifiers 114 of the primary cFCF 139 upon startup or when the network entities 140, 150, 160 discovers that the network entity 140, 150, 160 is a part of a stacked switch with a SUID that does not match the SUID 122 of the network entity 150, 160. When no network entity in a stacked switch is operating as a cFCF, the network entity 130, 140 may request input, such as firmware from the firmware provider 110. Each of the network entities 130, 140, 150, and 160 may be a distinct component of the stacked switch 120. Alternatively, one or more of the network entities 130, 140, 150, and 160 may be combined into various components in a collective or distributed arrangement.

In a particular embodiment, upon or during execution of the firmware 112, the cFCF 139 may determine whether the cFCF 139 is to operate in a first mode or a second mode. Firmware 113 may similarly determine whether the cFCF 149 is to operate in a first or second mode. The firmware 112 and 113 may include data that indicates in which mode each of the cFCFs 139 and 149 are to operate. In an illustrative embodiment, the first mode is a primary mode and the second mode is a secondary mode. For example, the network entity 130 may execute the firmware 112 and determine based on such execution that the cFCF 139 is to operate in the first mode (e.g. as a primary cFCF). Thus, the cFCF 139 may function as a primary cFCF, as shown. The network entity 140 may execute the firmware 113 and may determine based on such execution that the cFCF 149 is to operate in the second mode (e.g. as a secondary cFCF). Thus, the cFCF 149 may function as a secondary cFCF, as shown.

Upon determining that the cFCF 139 is to operate in the first mode (i.e. as a primary cFCF), the cFCF 139, may use the set of network identifiers 114 (e.g. fabric WWNs) to advertise fabric services. Fabric services may include, but are not limited to, Fiber Channel forwarding, Fiber Channel translation of data, and similar services that may be performed by a Fiber Channel switch within a Fiber Channel distributed network.

Upon determining that the cFCF 149 is to operate in the second mode (e.g. as a secondary cFCF), cFCF 149 may acquire the set of network identifiers 114 from the cFCF 139 functioning as a primary cFCF instead of using the network identifiers 115 from the firmware 113. For example, cFCF 149 may send a request 116 to the cFCF 139 and receive network identifiers 114 from the cFCF 139, as shown. The cFCF 149 may use the received network identifiers 114 to advertise fabric services. In a particular embodiment, the cFCF 149 is initially in a standby mode and does not advertise fabric services until switching to an active mode. Alternatively, cFCF 149 may advertise the fabric services upon receiving the network identifiers 114 from the network entity 130. Thus, the cFCF 149 may either initially advertise fabric services upon receipt of the network identifiers 114 or may advertise fabric services when the cFCF 149 is active and is switched to operate in a primary mode.

The primary cFCF 139 and the secondary cFCF 149 may be configured to communicate with other Fiber Channel units and other Fiber Channel forwarders. Such communications with other Fiber Channel fabrics and other Fiber Channel forwarders are further described with respect to FIG. 2.

When the network entity 130 is damaged or removed, because the secondary cFCF 149 has stored the network identifiers 114, the secondary cFCF 149 may take control over communications that were previously controlled by the primary cFCF 139. For example, one or more of the network entities 150, 160 may previously have been controlled by the primary cFCF 139 (e.g. prior to a disabling event), and after a transition due to the disabling event, the secondary cFCF 149 may take over control of the network entities 150, 160 previously controlled by the primary cFCF 139. Because the secondary cFCF 149 has access to configuration and network information of the primary cFCF 139, changing the secondary cFCF 149 from a standby mode to an active mode may be performed quickly in a manner that does not impact pending communications and connections of various entities within the stacked switch 120, including connections to external devices relying upon the Fiber Channel network of the stacked switch 120.

In a particular embodiment, the stacked switch 120 may be a chassis configured to accept one or more network entities that may be stored in various locations (e.g. any of multiple slots within the chassis). Each of the network entities 130, 140, 150 and 160 may be embodied within a removable component. For example, the stacked switch 120 may include a chassis that includes multiple slots and each of the network entities may be a card or other component, such as a network switch or similar device that may be inserted within one of the slots and may communicate with other network entities within the chassis or to hardware coupled thereto. Although four network entities are shown, there may be a different number of network entities (e.g. less than four or more than four) in the stacked switch 120. Furthermore, the network entities may include the same or similar hardware components. Differences shown between network entities in FIG. 1 may be due to differences in software running on the individual network entities including different firmware configurations of the individual network entities.

In an example of a single chassis, a backplane may be disposed within the stacked switch chassis, and each of the individual insertable components may be received and connected to the backplane in order to communicate with other components in the chassis. In other embodiments, the stacked switch 120 may be a logical configuration, and various components may be stored at different locations. Each of the various network entities may communicate between locations via an intermediate communication network or fabric. Thus, the network entity 130, functioning as a primary cFCF 139, and network entity 140, functioning as a secondary cFCF 149, may communicate with other components within the stacked switch 120 either via point-to-point individual connections or via distributed connections.

The system 100 of FIG. 1 may enable connections to the fabric controlled by the primary cFCF 139 to persist when the network entity 130 is damaged or removed from stacked switch 120 because the secondary cFCF 149 stores and uses the network identifiers 114 of the primary cFCF 139 to advertise fabric services in the event that the network entity 130 is disabled or removed from stacked switch 120.

Figure 2:
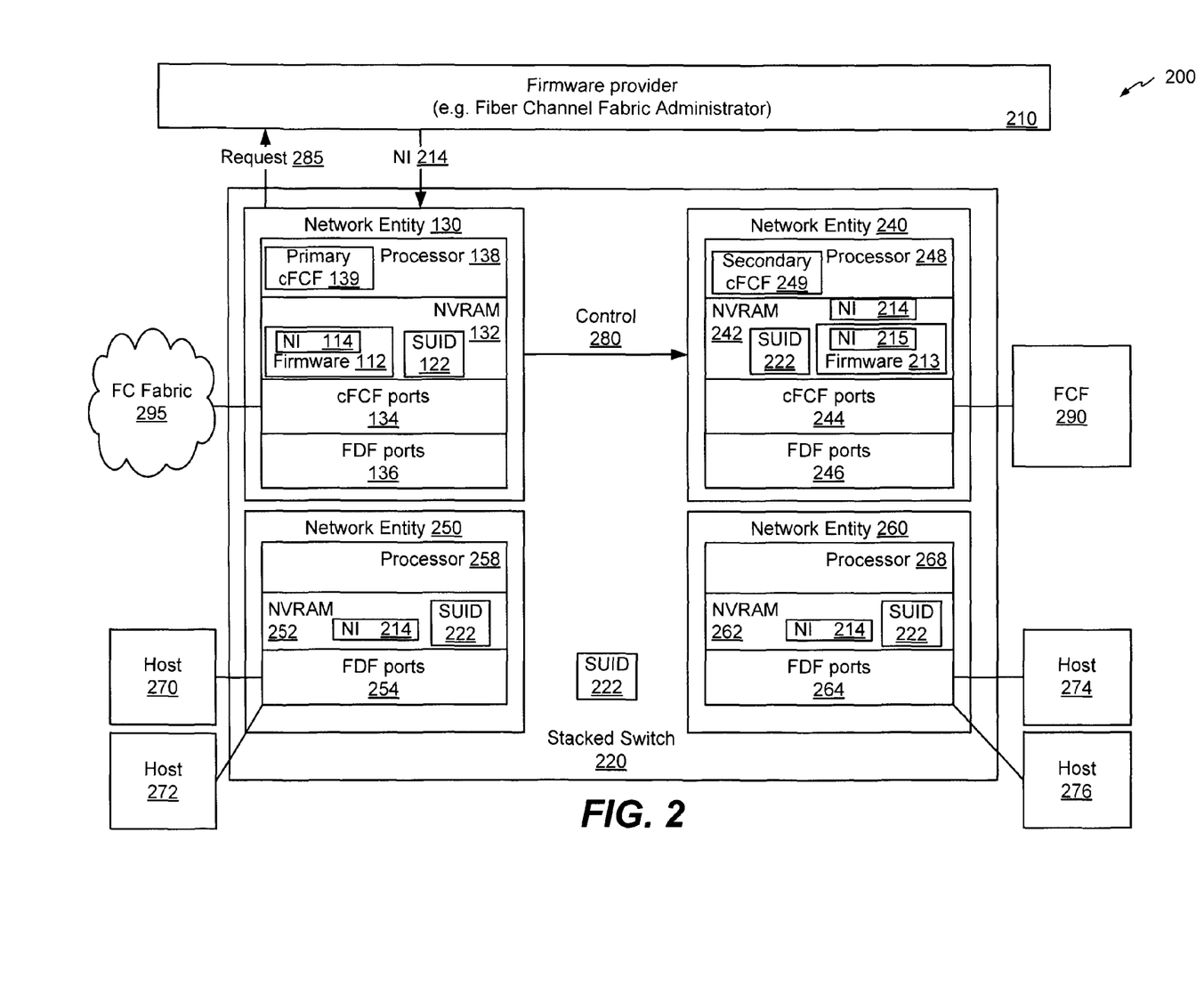
FIG. 2 is a diagram of a second system that is operable to continue functioning when a cFCF is moved from one stacked switch to another.

Referring to FIG. 2, another embodiment of a system 200 is shown. The system 200 includes a firmware provider 210, such as a Fiber Channel fabric administrator, and includes a stacked switch 220. The stacked switch 220 includes a plurality of network entities, such as the network entity 130 of FIG. 1, a network entity 240, a network entity 250, and a network entity 260. In a particular embodiment, the stacked switch 220 is a different stacked switch than the stacked switch 120 illustrated in FIG. 1. For example, the stacked switch 120 may be a first stacked switch, and the stacked switch 220 may be a second stacked switch that is different from the first stacked switch 120. The network entity 130 may be a removable component that was initially associated with (e.g., stored within) the first stacked switch 120 and at a later time was moved and associated with (e.g., inserted within) the second stacked switch 220. The other network entities 240, 250, 260 of the second stacked switch 220 were not associated with the first stacked switch 120 and thus, have a different SUID 222 than the SUID 122 of FIG. 1. The second stacked switch 220 is coupled to a plurality of external components, such as a Fiber Channel fabric 295, a FCF 290, and a plurality of external host devices, such as the illustrated host devices 270, 272, 274, and 276. While individual host devices are shown, it should be understood that the second stacked switch 220 may communicate with one or more hosts such as illustrated in FIG. 2 or may access a network that communicates with multiple tiers of hosts or other devices. In addition, while the stacked switch 220 is illustrated as communicating with a single Fiber Channel fabric 295, it should be understood that the second stacked switch 220 may communicate with multiple Fiber Channel fabrics and multiple Fiber Channel forwarders as part of a larger distributed network.

The second stacked switch 220 has a SUID 222. The SUID 222 uniquely, within a network, identifies and corresponds in a one-to-one manner with the second stacked switch 220. Thus, the SUID 222 is distinct from and differs from the SUID 122 of the first stacked switch 120 of FIG. 1. The network entity 240 includes a processor 248, a NVRAM 242, cFCF ports 244 and FDF ports 246. The network entity 250 includes a processor 258, a NVRAM 252 and FDF ports 254. Similarly, the network entity 260 includes a processor 268, a NVRAM 262 and FDF ports 264. Each of the FDF ports 254, 264 may communicate with a host device 270-276. Each of the FDF ports 136 and 246 may also communicate with a host device. The cFCF ports 134 and 244 may communicate with the Fiber Channel fabric 295 or the FCF 290. The network entity 130, functioning as a primary cFCF 139, may control communications of the various FDF ports 136, 246, 254, 264. The network entity 240, functioning as a secondary cFCF 249, may control the various FDF ports 136, 246, 254, 264 when the secondary cFCF 249 is switched to the first mode and begins to function as the primary cFCF.

During operation, the network entity 130 executes the firmware 112 or such firmware may have been previously executed when the network entity 130 was associated with the first stacked switch 120. After being associated with the second stacked switch 220, the network entity 130 accesses the NVRAM 132 in order to retrieve the SUID 122. The network entity 130 compares the SUID 122 to the SUID 222. Because the SUID 122 is different than the SUID 222, the network entity 130 determines that it has been moved to a new location (e.g. a different stacked switch). In response to determining that the network entity 130 has been moved, the network entity 130 requests input regarding fabric services that are available. For instance, the network entity 130 may send a request 285 to the firmware provider 210. In response to the request 285, the firmware provider 210 may send a reply that includes network identifiers 214 that correspond to the network identifiers 214 being used by the secondary cFCF 249 to advertise fabric services. The network entity 130 may then store the network identifiers 214 within the NVRAM 132. The primary cFCF 139 may then communicate with the secondary cFCF 249 and may send a control signal 280 to the secondary cFCF 249. The control signal 280 informs the secondary cFCF 249 that the primary cFCF 139 is taking control over various components within the second stacked switch 220 as a primary cFCF. The secondary cFCF 249 may communicate with the primary cFCF 139 in order to coordinate a transition to establish the primary cFCF 139 as the primary cFCF for the second stacked switch 220. The primary cFCF 139 may then advertise fabric services using the received network identifiers 214 as a primary cFCF. For example, the primary cFCF 139 may advertise Fiber Channel services to various external components, such as the Fiber Channel fabric 295, the FCF 290, or any of the hosts 270-276.

Thus, the system 100 of FIG. 1 and system 200 of FIG. 2 may enable a distributed FCF to continue functioning without interruption to connections to endpoint devices even when the primary cFCF is removed or ceases to function. In addition, moving a cFCF from an association with a first stacked switch to an association with a second stacked switch will not cause two stacked switches to share network identifiers (e.g., WWNs which should be globally unique) which could result in a breakdown of fabric services. For example, the secondary cFCF 149 of FIG. 1 stores the network identifiers 114 of the primary cFCF 139. If the primary cFCF 139 is then removed from the stacked switch 120, the secondary cFCF 149 may use the network identifiers 114 to continue managing connections to endpoints without interruption due to a change in network identifiers. Furthermore, as shown in FIG. 2, the network entity may 130 detect when the network entity 130 has been moved to a second stacked switch 220, and the primary cFCF 139 running on the network entity 130 does not use network identifiers 114 that could still be in use by the components of stacked switch 120 of FIG. 1 to advertise fabric services. Instead, the primary cFCF 139 may obtain a new set of network identifiers, such as the network identifiers 214 already in use at the stacked switch 220, to advertise fabric services.

Figure 3:
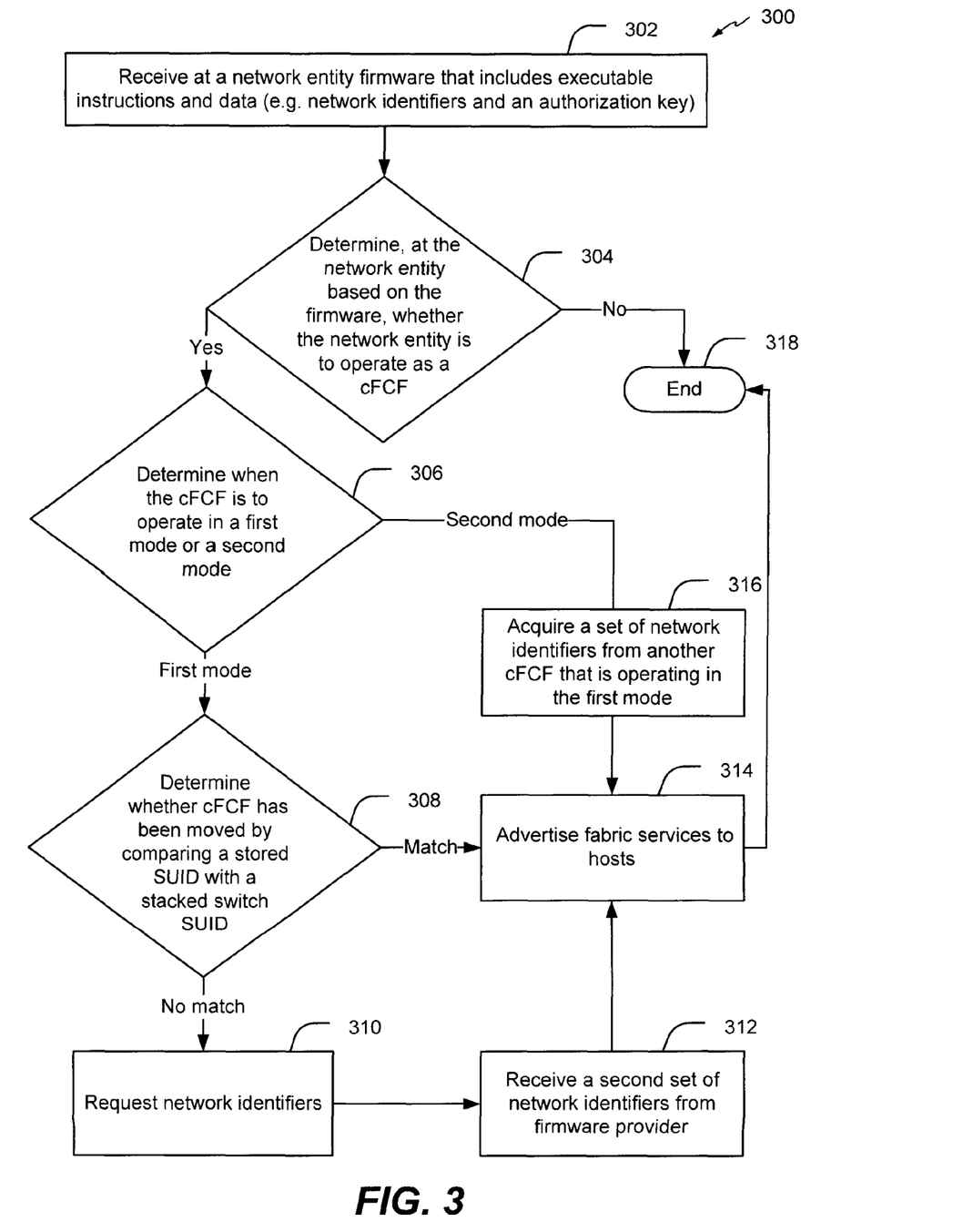
FIG. 3 is a flowchart of a method of receiving firmware including network identifiers.

Referring to FIG. 3, a particular embodiment of a method 300 that may be performed within a component of a stacked switch is illustrated. The method 300 may be performed, for example, by components within the stacked switch 120 of FIG. 1 or components within the stacked switch 220 of FIG. 2. The method 300 includes receiving, at a network entity, firmware that includes executable instructions and data (e.g. network identifiers and an authentication key), at 302. The method 300 also includes determining at the network entity based on the firmware whether the network entity is to operate as a cFCF, at 304. If the network entity is to operate as a cFCF, the method 300 proceeds to determine whether the cFCF is to operate in a first mode or a second mode, at 306.

If the cFCF is to operate in the first mode, the method 300 further includes determining whether the network entity has been moved by comparing a stored SUID with a stacked switch SUID, at 308. Upon determining a match between the stored SUID and the stacked switch SUID at 308, the method 300 further includes advertising fabric services to one or more hosts, at 314. The method 300 ends, at 318.

Alternately, upon determining that there is no match between the stored SUID and the stacked switch SUID at 308, the method 300 includes requesting network identifiers, at 310, and receiving a second set of network identifiers from a firmware provider, at 312. For example, the network entity 130 of FIG. 2 may compare the SUID 122 stored in NVRAM 132 to the SUID 222 of stacked switch 220 to determine that the network entity 130 has been moved. The network entity 130 may then send the request 285 to the firmware provider 210 and receive network identifiers 214 from the firmware provider 210. The method 300 may include advertising fabric services to one or more hosts such as hosts (such as, 270, 272, 274 and 276 of FIG. 2), at 314. The method 300 ends, at 318.

Returning to 306, when the cFCF is to operate in the second mode, the method 300 includes acquiring a set of network identifiers from another cFCF that is operating as a primary cFCF, at 316. For example, referring to FIG. 1, the network entity 140, functioning as the secondary cFCF 149, may receive the network identifiers 114 from the network entity cFCF 130 functioning as the primary cFCF 139 in response to sending the request 116 to the primary cFCF 139. The method 300 further includes, after acquiring the set of network identifiers at 316, advertising fabric services to one or more hosts, at 314. The method ends at 318.

Thus, the method 300 provides a mechanism to use firmware to facilitate configuration and operation of a primary cFCF, a secondary cFCF, or both. In addition, the method 300 may enable performing additional actions to acquire appropriate network identifiers in order advertise fabric services to hosts in response to movement of a removable component.

Figure 4:
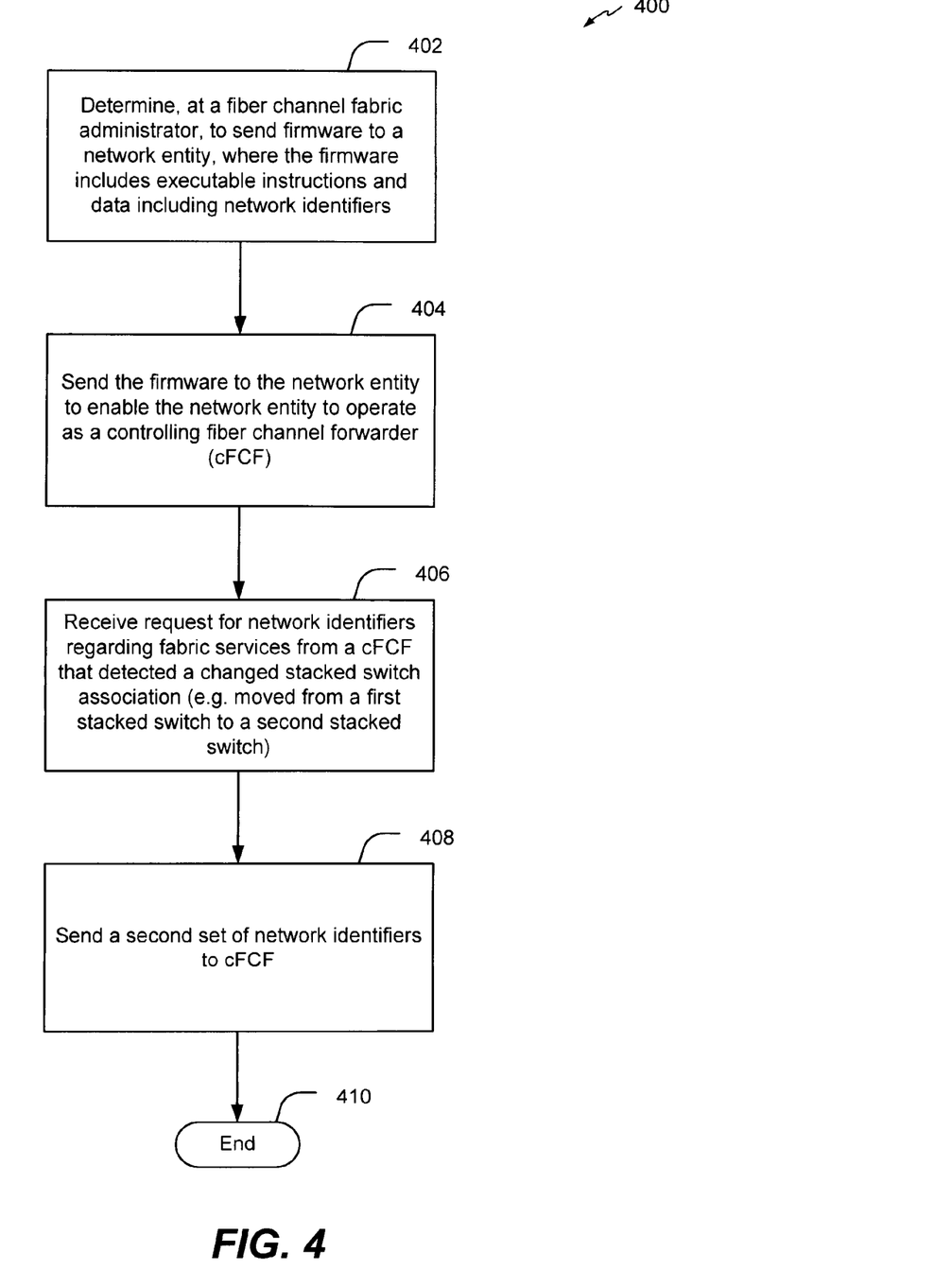
FIG. 4 is a flowchart of a method of distributing firmware including network identifiers.

Referring to FIG. 4, a particular embodiment of a method 400 that can be performed by a firmware provider (e.g. the Fiber Channel fabric administrator 110 of FIG. 1 or 210 of FIG. 2) is shown. The method 400 includes determining, based on a request at the firmware provider, to send firmware to a network entity, where the firmware includes executable instructions and data including network identifiers, at step 402. For example, the firmware provider 110 of FIG. 1 may determine to send the firmware 112 to the network entity 130. The method 400 may include sending the firmware to the network entity to enable the network entity to operate as a cFCF, at 404. Proceeding to 406, the method 400 includes receiving a request for network identifiers regarding fabric services from a cFCF (e.g., a cFCF that detected a changed stacked switch association). To illustrate, the firmware provider 210 of FIG. 2 may receive the request 285 from the network entity 130 in response to the network identity 130 detecting that SUID 122 does not match SUID 222. The method 400 may include sending a second set of network identifiers to the cFCF in response to the request, at 408. For example, the firmware provider 210 of FIG. 2 may send the network identifiers 214 to the network entity 130 in response to the request 285. The method 400 ends at 410.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware (e.g., 112 and 113 of FIG. 1), resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, NVRAM (such as NVRAM 132, 142, 152 and 162 of FIG. 1 and 132, 242, 252, and 262 of FIG. 2) or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

What is claimed is:

1. A method comprising:
   receiving firmware at a network entity device, wherein the network entity device comprises a component of a stacked switch, and wherein the firmware includes an authorization key;
   determining, at the network entity device based on the firmware, that the network entity device is to operate as a first controlling Fiber Channel forwarder (cFCF); and
   determining, at the network entity device, that the network entity device has been moved from a first stacked switch to a second stacked switch.

2. The method of claim 1, wherein the firmware includes a set of network identifiers.

3. The method of claim 1, further comprising determining, at the network entity device, whether the network entity device is to operate in a first cFCF mode or a second cFCF mode.

4. The method of claim 3, further comprising, upon determining that the network entity device is to operate in the second cFCF mode:
   acquiring, by the network entity device a set of network identifiers from a device operating as a second cFCF in the first cFCF mode; and using, by the network entity, the acquired set of network identifiers to advertise fabric services.

5. The method of claim 1, further comprising, in response to determining that the network entity device has been moved from the first stacked switch to the second stacked switch, requesting, by the network entity device from a Fiber Channel fabric administrator, input regarding fabric services associated with a distributed Fiber Channel forwarding system.

6. The method of claim 5, wherein determining that the network entity device has been moved from the first stacked switch to the second switch comprises:
comparing, by the network entity device, a first system unique identifier (SUID) of the stacked switch that includes the network entity device to a second SUID stored within the network entity device; and
determining that the first SUID is different than the second SUID.

7. The method of claim 1, further comprising storing the firmware in a non-volatile memory of the network entity device, wherein the firmware comprises a set of executable instructions and data, and wherein the firmware is configured to program the network entity device to operate as the first cFCF, the first cFCF included in a distributed Fiber Channel forwarding system.

8. The method of claim 1, further comprising, in response to determining that the network entity device is to operate as the first cFCF, configuring the network entity device to operate as the first cFCF, wherein the network entity device operating as the first cFCF is configured to communicate with one or more Fiber Channel fabrics, one or more Fiber Channel Forwarders, or a combination thereof.

9. A method comprising:
determining, based on a request at a Fiber Channel fabric administrator, to send firmware to a network entity device, wherein the Fiber Channel fabric administrator comprises a computing device, and wherein the network entity device comprises a component of a stacked switch; and
sending the firmware from the Fiber Channel fabric administrator to the network entity device to configure the network entity device to operate as a controlling Fiber Channel forwarder (cFCF), wherein the firmware includes a set of network identifiers and an authorization key.

10. The method of claim 9, further comprising:
in response to a first indication by the firmware that the network entity device is to operate as the cFCF in a second cFCF mode:
configuring the network entity device as the cFCF operating in the second cFCF mode; and
requesting an updated set of network identifiers; and
in response to a second indication by the firmware that the network entity device is to operate as the cFCF in a first cFCF mode:
configuring the network entity device as the cFCF operating in the first cFCF mode; and
determining whether the network entity device operating as the cFCF in the first cFCF mode has been moved from a first stacked switch to a second stacked switch.

11. A computer program product for managing a controlling Fiber Channel forwarder comprising:
a computer readable storage device;
program instructions to determine, at a network entity device, that the network entity device is to operate as a first controlling Fiber Channel forwarder (cFCF), wherein the network entity device comprises a component of a stacked switch,
wherein the program instructions and an authorization key are received from a Fiber Channel fabric administrator and stored on the computer readable storage device; and
a processor configured to execute the program instructions to acquire a set of network identifiers from a device operating as a second cFCF.

12. The computer program product of claim 11, wherein the program instructions are executable by the processor to:
determine that the network entity device operating as the first cFCF has been moved from a first stacked switch to a second stacked switch in response to a determination that a system unique identifier (SUID) of the stacked switch is different than a SUID stored at the network entity device; and
request an updated set of network identifiers in response to the determination that the network entity device has been moved.

13. The method of claim 1, further comprising determining, at the network entity device, that the network entity device is to operate as the first cFCF in a first cFCF mode prior to determining that the network entity device has moved from the first stacked switch to the second stacked switch.

14. The method of claim 1, further comprising, in response to determining that the network entity device operating as the first cFCF has not been moved from the first stacked switch to the second stacked switch, advertising one or more fabric services by the network entity device.

15. The method of claim 9, further comprising:
receiving, at the Fiber Channel fabric administrator, a request for an updated set of network identifiers from the network entity device after the network entity device has moved from a first stacked switch to a second stacked switch; and
sending, by the Fiber Channel fabric administrator, an updated set of network identifiers to the network entity device.

16. The computer program product of claim 11, wherein the set of network identifiers are acquired by the network entity device operating as the first cFCF in response to a request from the network entity device to the device operating as the second cFCF.

17. The computer program product of claim 11, wherein the set of network identifiers are acquired from the device operating as the second cFCF in a first cFCF mode while the network entity device is in a second cFCF mode, the first cFCF mode different than the second cFCF mode.

18. The computer program product of claim 17, wherein the second cFCF mode is associated with a standby mode, and wherein, when the network entity device is operating as the first cFCF in the second cFCF mode, the program instructions are executable by the processor to automatically change the network entity device to the first cFCF mode in response to a triggering event.

19. The computer program product of claim 18, wherein the triggering event includes a removal of, a disabling of, or damage to the device operating as the second cFCF in the first cFCF mode.

* * * * *